United States Patent
Lee et al.

(10) Patent No.: US 7,814,164 B2
(45) Date of Patent: Oct. 12, 2010

(54) DISTRIBUTED AND SCALABLE INSTANT MULTIMEDIA COMMUNICATION SYSTEM

(75) Inventors: Jaushin Lee, Saratoga, CA (US); Budi Sutardja, San Francisco, CA (US); Chunchau Lin, Cupertino, CA (US)

(73) Assignee: Imera Systems, Inc., San Jose, CA (US)

( * ) Notice: Subject to any disclaimer, the term of this patent is extended or adjusted under 35 U.S.C. 154(b) by 193 days.

(21) Appl. No.: 12/171,773

(22) Filed: Jul. 11, 2008

(65) Prior Publication Data

US 2008/0275958 A1 Nov. 6, 2008

Related U.S. Application Data

(62) Division of application No. 11/141,767, filed on May 31, 2005, now Pat. No. 7,512,984.

(51) Int. Cl.
*G06F 15/173* (2006.01)
(52) U.S. Cl. ...................................................... 709/206
(58) Field of Classification Search ................. 709/206, 709/230
See application file for complete search history.

(56) References Cited

U.S. PATENT DOCUMENTS

| 6,898,623 | B1* | 5/2005 | Williams et al. ............. 709/206 |
| 6,985,925 | B2* | 1/2006 | Ogawa ........................ 709/206 |
| 7,260,837 | B2* | 8/2007 | Abraham et al. ............... 726/4 |
| 7,275,095 | B1* | 9/2007 | Lebouill ..................... 709/223 |
| 7,360,078 | B1* | 4/2008 | Lebouill ..................... 713/155 |
| 7,493,655 | B2* | 2/2009 | Brown ......................... 726/5 |
| 7,539,291 | B2* | 5/2009 | D'Angelo et al. ........ 379/88.17 |
| 2003/0007464 | A1 | 1/2003 | Balani |
| 2004/0088423 | A1 | 5/2004 | Miller et al. |
| 2004/0153512 | A1 | 8/2004 | Friend |

FOREIGN PATENT DOCUMENTS

WO 03/094011 A1 11/2003

\* cited by examiner

*Primary Examiner*—David Y Eng
(74) *Attorney, Agent, or Firm*—Pinnacle Patent Law Group

(57) ABSTRACT

A method for addressing an entity for an internet-based service other than electronic mailing includes selecting a prefix that is uniquely associated the internet-based service, providing an email address for the entity, where the email address includes a username and domain, and attaching the prefix to the domain to convert automatically the email address into an address for the entity for the internet-based service.

4 Claims, 5 Drawing Sheets

DISTRIBUTED AND SCALABLE INSTANT MULTIMEDIA COMMUNICATION SYSTEM

CROSS-REFERENCE TO RELATED APPLICATIONS

This application is a divisional of application Ser. No. 11/141,767 filed May 31, 2005, now U.S. Pat. No. 7,512,984, the entirety of which is incorporated herein by reference.

FIELD OF THE INVENTION

The present invention relates to enterprise networking, and more particularly to a distributed and scalable instant multimedia communication system.

BACKGROUND OF THE INVENTION

Instant messaging (IM) services provide a well known mechanism for allowing computer users to communicate in real-time. Such services are typically provided over the Internet by an independent service provider, such as AOL, MSN, Yahoo, and other similar service providers. Because of its convenience and ease of use, IM has become one of the most popular methods to communicate with family and friends over the Internet. Indeed, at the release of its latest IM package, one of the leading service providers indicated that it now had more than 155 million registered users who collectively exchanged more than 2.5 billion instant messages every day.

For the same reasons that IM is so popular with consumers, the use of IM as a means of business communication has also grown rapidly. Analysts have predicted that within a few years, hundreds of millions of corporate IM users will exist globally. Yet, IM's explosive growth has created a number of problems for businesses, namely issues of security and exposure to viruses.

This need for security has spawned a number of IM client-server solutions designed for corporate use. With these solutions, IM communications are controlled and monitored within an enterprise, and insulated from a public network by at least one firewall. Typically, existing solutions implement a single client-server model where a plurality of internal clients are coupled to an internal IM server that resides behind at least one firewall. For security reasons, access to the internal IM server from the Internet is prohibited.

In this manner, it is possible for IT personnel to keep IM communications safely encrypted behind a corporate firewall, rather than traveling unencrypted over the Internet, where hackers or other malicious eavesdroppers can listen in on conversations with relative ease. The corporation can create and control user accounts, log conversations, and ensure that the communications are encrypted. Moreover, the corporation can control the communication flow, such that IM communications are not passed from client to client, but rather from client to IM server to client.

Although existing corporate solutions offer the advantages of IM within an enterprise, i.e., behind the firewall, they do not facilitate such communications between IM servers in different companies that may or may not be protected by firewalls. Accordingly, business-to-business IM communications still require an independent service provider on the Internet to facilitate IM communications through firewalls. This, however, presents security issues and exposure to viruses.

In addition, because existing solutions rely on the single client-server model, where the server is isolated from other servers for security reasons, the existing solutions are not scalable. Accordingly, existing solutions may not be suitable for a large enterprise that can have hundreds of thousands of employees residing in different offices in different countries and continents.

Accordingly, there is a need for a distributed instant communication system that not only allows users within an enterprise to engage in secure IM communications, but also allows secure IM communications between users in different enterprises without requiring an independent IM service provider. The system should be scalable and should regulate traffic according to corporate security policies.

BRIEF SUMMARY OF THE INVENTION

In one version of the present invention, a distributed instant multimedia communication (IMC) system that allows users to communicate with one another in real-time includes a plurality of autonomous networks. Each autonomous network includes at least one server that supports (IMC) sessions for a plurality of clients registered on the server, and a multi-point switch unit coupled to the server(s) that sends data out of and receives data into the autonomous network, and routes data within the autonomous network through the server(s). In addition the IMC system includes a network coupled to the autonomous networks. The network sends data between the autonomous networks so that the autonomous networks can communicate with one another. Because each autonomous network is capable of communicating with other autonomous networks in a secure manner over the network, two or more clients in one or more autonomous networks can conduct a secure IMC session with one another without requiring an independent service provider.

In another version of the present invention, a scalable instant multimedia communication network includes at least one server that supports instant multimedia communication (IMC) sessions for a plurality of clients registered on the server, and a multi-point switch unit coupled to the server(s) that sends data out of and receives data into the autonomous network, and routes data between server(s). The instant multimedia communication network can be expanded or contracted by coupling additional or fewer servers to the multi-point switch unit.

In another version of the present invention, a method and computer readable medium containing program instructions for providing a direct and secure real-time communication session between a first client in a first domain and a second client in a second domain includes receiving by a first server in the first domain a request from the first client to send an invitation to the second client to engage in a real-time communication session. If the request is granted, the invitation is sent from the first domain directly to the second domain. The invitation is received by the second client via a second server in the second domain. If the second client accepts the invitation, the secure real-time communication session is formed between the first client in the first domain and the second client in the second domain via the first server and the second server. The first client and the second client are participants in the secure real-time communication session and the secure real-time communication session across the first and second domains is established without interacting with an independent instant messaging service provider.

In another version of the present invention, a method and computer readable medium containing program instructions for addressing an entity for an internet-based service other than electronic mailing includes selecting a prefix that is uniquely associated the internet-based service, providing an email address for the entity, where the email address includes a username and domain, and attaching the prefix to the domain to convert automatically the email address into an address for the entity for the internet-based service.

In another version of the present invention, a method and computer readable medium containing program instructions for providing within an enterprise a direct and secure real-time communication session between a first client registered on a first server and a second client registered on a second server includes receiving by the first server a request from the first client to send an invitation to the second client to engage in a real-time communication session, and sending the request from the first server to a multi-point switch unit coupled to the first server and to the second server, where the multi-point switch unit determines whether to grant or deny the request based on security policies of the enterprise. If the request is granted, the invitation is sent from the multi-point switch unit directly to the second server and received by the second client via the second server. If the second client accepts the invitation, the secure real-time communication session is formed between the first client and the second client via the first server and the second server. In this manner, the secure real-time communication session across the first and second servers is established without interacting with an independent instant messaging service provider.

BRIEF DESCRIPTION OF SEVERAL VIEWS OF THE DRAWINGS

These features, aspects and advantages of the present invention will become better understood with regard to the following description, appended claims, and accompanying drawings, which illustrate examples of the invention. However, it is to be understood that each of the features can be used in the invention in general, not merely in the context of the particular drawings, and the invention includes any combination of these features, where:

DETAILED DESCRIPTION OF THE INVENTION

The present invention relates to enterprise networking, and more particularly to a distributed instant multimedia communication system that allows a plurality of autonomous instant multimedia networks to communicate with one another in real-time over a secure connection. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Figure 1A:
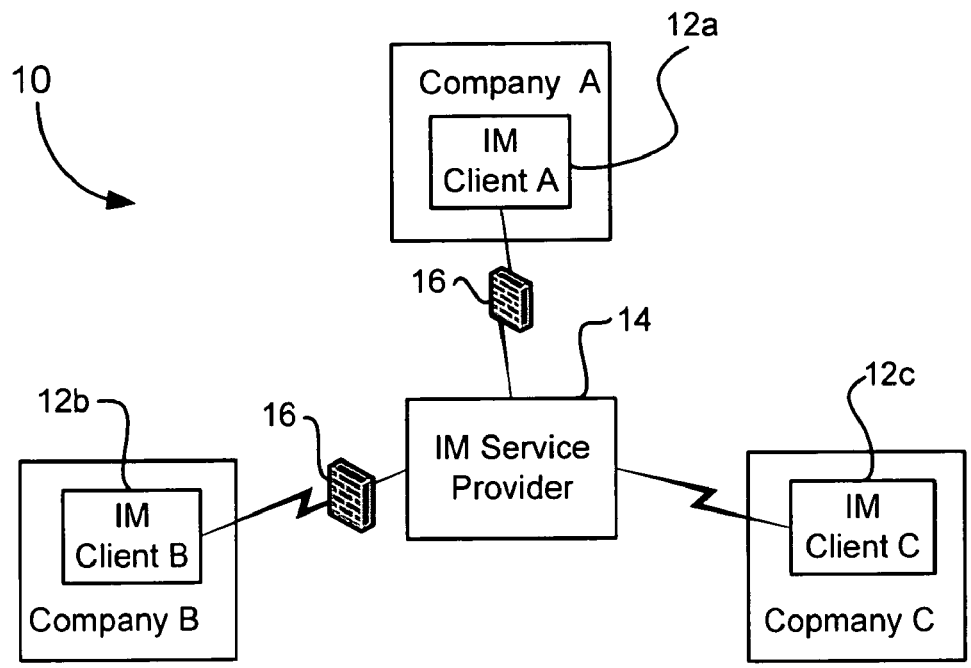
FIG. 1A is a block system diagram of a typical IM communication network.

A typical IM communication network 10 is illustrated in FIG. 1A. In this example, a plurality of IM clients 12a-12c reside in different companies or domains. Each IM client 12a-12c registers with an IM service provider 14 such as MSN or AOL. Once registered, an IM client, e.g., IM client A (12a), can exchange real time messages with another IM client, e.g., IM client B (12b), via the IM service provider 14, assuming IM client B (12b) is logged on to the system 10. The IM service provider 14 is typically an independent entity that is accessed through the Internet (not shown) by the IM clients 12a-12c. IM exchanges between IM clients 12a, 12b usually involve traversing corporate firewalls 16 and bypassing internal corporate security policies. Accordingly, IM exchanges can present a security threat to the company from viruses or competitors.

Figure 1B:
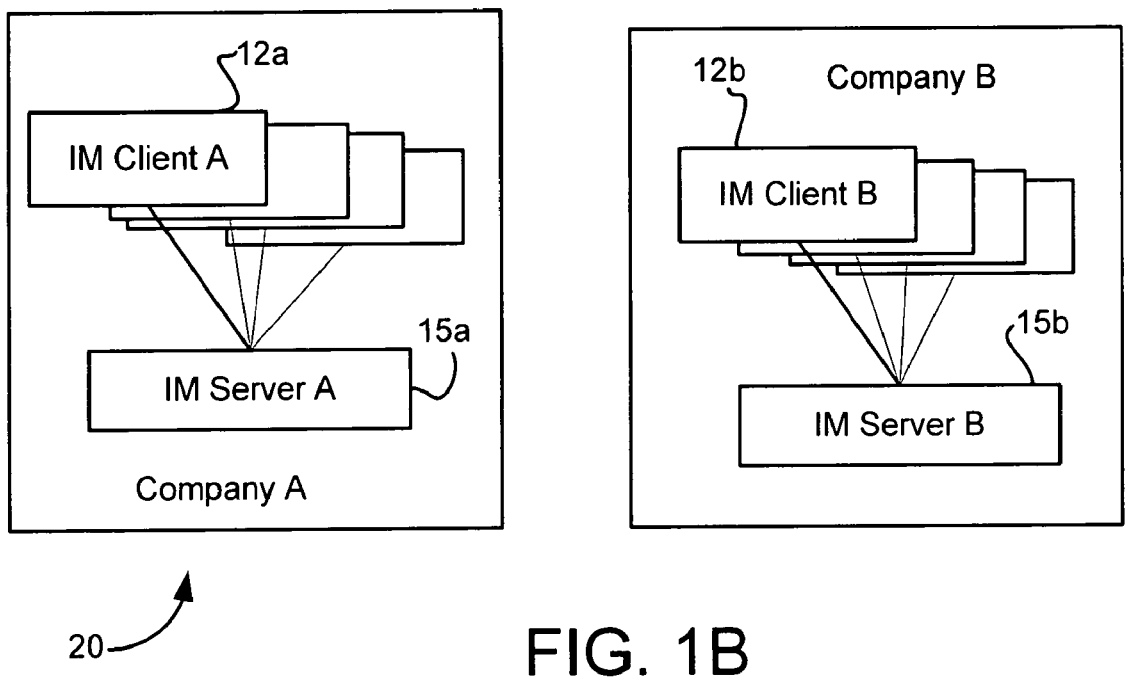
FIG. 1B is a block system diagram of an exemplary corporate IM system.

Despite these serious concerns, however, companies appreciate the utility associated with IM communications and implement internal IM communication systems. FIG. 1B illustrates an exemplary corporate IM system 20. As is shown, each company or domain, e.g., company A, includes a plurality of IM clients 12a that are registered with an internal IM server 15a. The internal IM server 15a manages presence information for each of the IM clients 12a and facilitates real time communication between the registered IM clients 12a within the company. Because the IM server 15a is administered by the company, IM exchanges between IM clients 12a can be monitored and logged, and access controls can be implemented.

In this system 20, however, each IM server 15a, 15b is insulated from all external traffic for security purposes. External access to the IM server 15a from outside of the firewall (not shown) is typically denied. Because the IM server 15a cannot communicate with any other IM server, e.g., IM Server B (15b), business-to-business IM exchanges that provide the same level of security are not possible.

According to the preferred version of the present invention, an instant multimedia communication (IMC) system is a networked system including a plurality of IMC autonomous networks (IMC networks). Each IMC network includes at least one IMC server that supports a plurality of IMC clients that register with the IMC server. In a preferred embodiment, each IMC network is capable of communicating with other IMC networks in a secure manner either over an intranet within a company or over a public network, such as the Internet. Thus, secure IMC sessions can be implemented between IMC clients in at least two companies without requiring an independent IM service provider. Also, because IMC networks are not isolated from one another, the IMC system is scalable, that is, the IMC system can expand or contract with the needs of a company.

Figure 2:
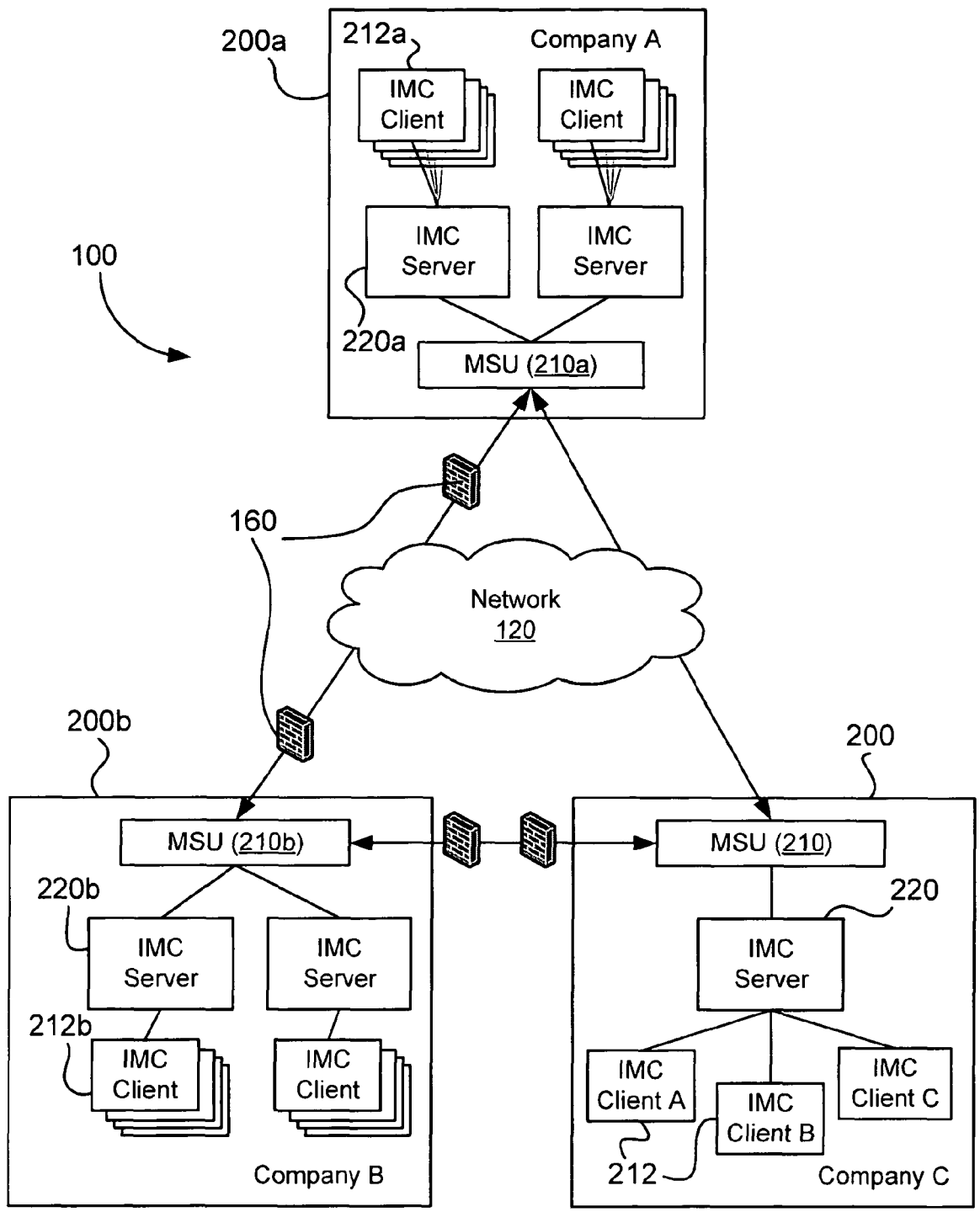
FIG. 2 is a block system diagram of a distributed instant multimedia communication system according to a version of the present invention.

FIG. 2 is a system block diagram of the IMC system 100 according a version of the present invention. In this example, a plurality of companies each host an IMC network 200, 200a, 200b that is typically behind at least one firewall 160. Although FIG. 2 shows each company hosting one IMC network 200, it should be appreciated that more than one IMC network 200 can be hosted by a single company or enterprise. For example, company A and company C can be subsidiaries or subdivisions of a single enterprise. Each IMC network, e.g., 200a, is configured to communicate with other IMC networks 200, 200b over a network 120. The network 120 can be a private network, such as an intranet or LAN, or a public network, such as the Internet.

Each IMC network, e.g., 200, includes a plurality of IMC clients 212, at least one IMC server 220, and a multi-point switch unit (MSU) 210. Each IMC client 212 is registered on an IMC server 220 such that the IMC server 220 is aware of each of its IMC clients 212 and can receive and provide presence information from and to each registered IMC client 212. The IMC server 220 also facilitates real-time communications involving its IMC clients 212. Each IMC server 220 is in communication with the MSU 210.

According to a preferred version of the present invention, the MSU 210 allows the IMC servers 220 within the IMC autonomous network 200 to communicate securely with one another. In addition, the MSU 210 is capable of communicating with an MSU 210 in another IMC autonomous network, e.g., 200b, such that secure inter-network data exchange is facilitated. In this manner, an IMC server 220 in one IMC autonomous network 200 can exchange data with an IMC server 220 in another IMC autonomous network 200a via their respective MSUs 210. For example, presence information can be passed from one IMC server 220 to one or more IMC servers, e.g., 220a, 220b, through one or more MSUs 210, 210a, 210b. The secure inter-network communication can involve two or more IMC networks 200, 200a, 200b to form one real-time communication session.

Each MSU 210 is capable of traversing a firewall 160 if the MSU 210 of another IMC network, e.g., 200b, resides behind a firewall. This would typically be the case when one IMC network 200a hosted by one company communicates with the other IMC networks 200b hosted by other unaffiliated companies via the Internet 120. Thus, business-to-business communication in real-time is facilitated without requiring an independent service provider outside of the firewall 160.

In one version of the present invention, an IMC network 200 can include more than one MSU 210. For instance, an additional MSU 210 can be configured to provide redundancy if one of the MSUs 210 fails. Moreover, in another version, several MSUs 210 can be utilized to provide load balancing among the IMC servers 220. Accordingly, the present invention is not limited to the configuration illustrated in FIG. 2, but rather FIG. 2 is an exemplary version of the present invention.

Figure 3:
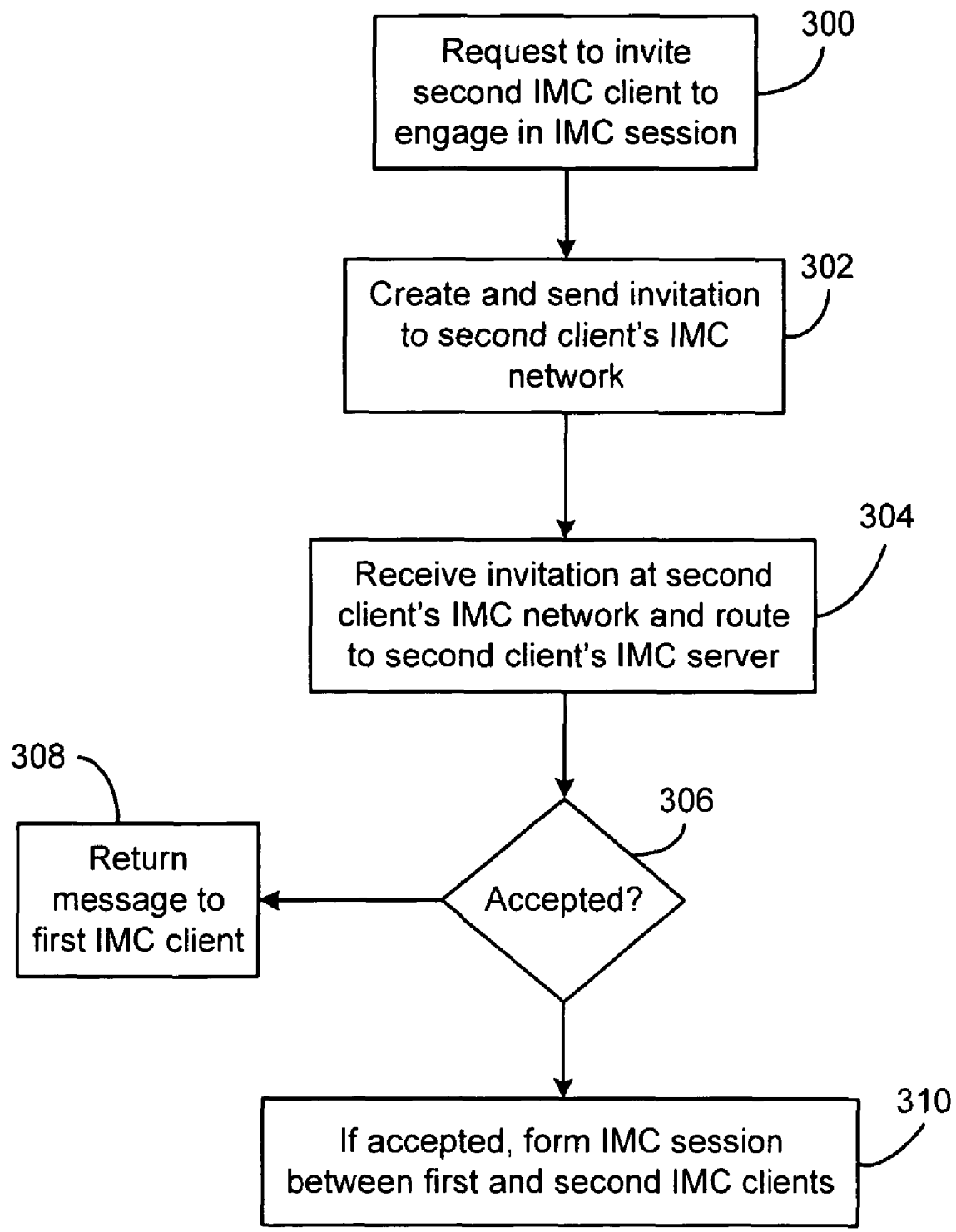
FIG. 3 is a high level flowchart illustrating a process for forming a secure IMC session according to a version of the present invention.

FIG. 3 is a flowchart illustrating a process for forming a secure IMC session between two IMC clients according to a version of the present invention. In this example, the two IMC clients 212a, 212b are registered on two different IMC servers 220a, 220b in different IMC networks 200a, 200b. Referring to FIG. 2 and FIG. 3, the process begins when a first IMC client, e.g., IMC client 212a, makes a request to invite a second IMC client, e.g., IMC client 212b, to engage in an IMC session (step 300). The request is sent to the first IMC client's IMC server 220a, which then creates and sends the invitation to the second IMC client's IMC network 200b via the MSU 210a (step 302).

In a preferred embodiment, each MSU 210 is configured to execute well known firewall traversal technology. Accordingly, each MSU 210 can send data to and receive data from other MSUs 210a, 210b in the IMC system 100 without comprising security.

After the first client's MSU 210a sends the invitation, the MSU 210b in the second IMC client's IMC network 200b receives the invitation and, if appropriate, routes the invitation to the second IMC client's IMC server 220b (step 304). The IMC server 220b determines whether the invitation is accepted or rejected (step 306). The MSU 210b and/or IMC server 220b can accept or reject an invitation based on a variety of reasons, including, but not limited to, the availability of the second IMC client 212b, the validity of the network connection information and security control, the receiving company's security policy and the inviting company's security policy. Other restrictions can apply which can be customized to the company's needs.

If the invitation is inappropriate and/or rejected, a message is returned to the first IMC client's IMC network 200a (step 308). The message can indicate the reason(s) why the invitation was inappropriate and/or declined. For example, the message can indicate that the second IMC client 212b is presently in a meeting and cannot engage in an IMC session. If the invitation is appropriate and accepted, the IMC server 220b forms a secure IMC session between the first IMC client and the second IMC client in collaboration with the first IMC client's IMC server 220a (step 310).

Once the secure IMC session is formed between the two IMC clients 212a, 212b, several data communication channels can be established for different applications (e.g. text message, application sharing, audio, and video). In a preferred embodiment, all data can travel through the one or both MSUs 210a, 210b. All data sent between the MSUs 210a, 210b can be encrypted using a method and keys determined at IMC session connection time.

Figure 4:
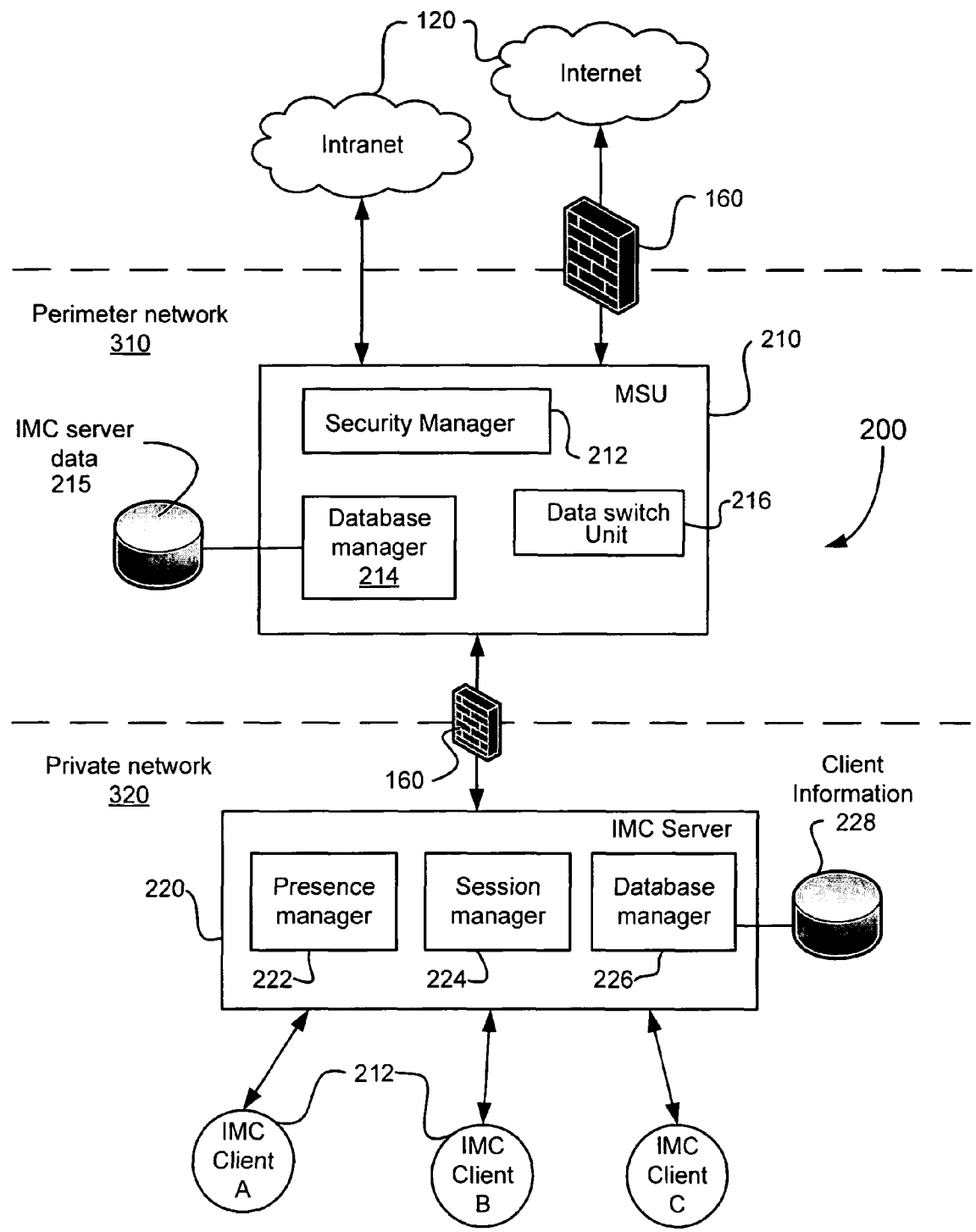
FIG. 4 is a system block diagram of an exemplary IMC network according to a version of the present invention.
Figure 5:
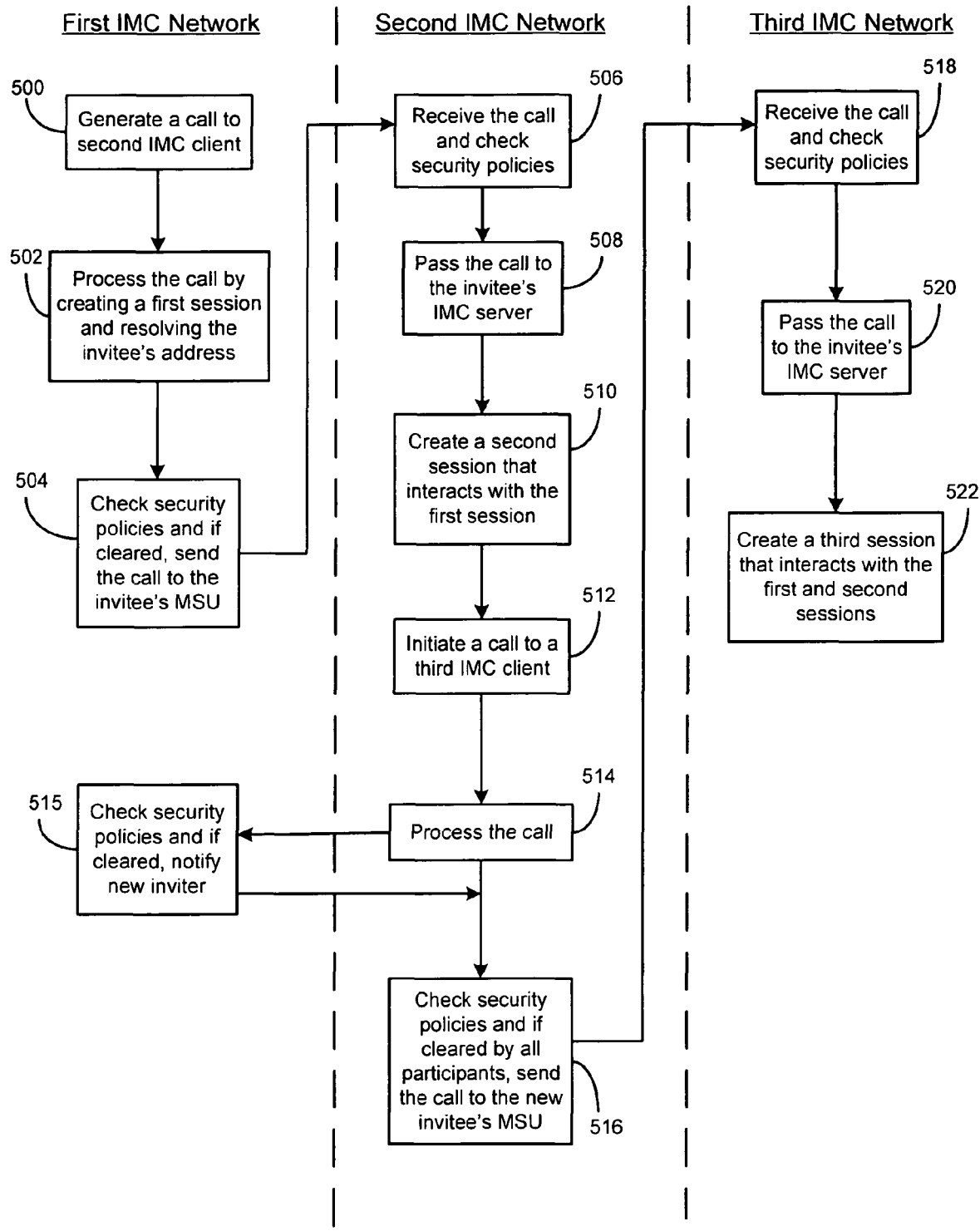
FIG. 5 is a detailed flow diagram illustrating a process for establishing a secure IMC session according to a version of the present invention.

To describe in more detail the features of the preferred embodiment of the present invention, please refer to FIG. 4 and FIG. 5. FIG. 4 is a system block diagram of an exemplary IMC network 200 according to a version of the present invention, and FIG. 5 is a more detailed flow diagram illustrating a process for establishing a secure IMC session according to a version of the present invention. For the sake of clarity, FIG. 4 shows only one IMC server 220 in communication with the MSU 210. As stated above, however, a plurality of IMC servers 220 can be coupled to the MSU 210.

Referring first to FIG. 4, the MSU 210 manages outgoing calls or invitations from the IMC server 220 and handles incoming invitations from other external IMC servers 220 in other IMC networks, e.g., 200a, 200b, inside or outside of the company. The MSU 210 includes a security manager 212, a database manager 214 and a data switch unit 216, and preferably resides inside of a firewall 160 in a perimeter network 310.

The security manager 212 regulates incoming and outgoing invitations pursuant to the company's security policies. Accordingly, if the corporate security policy bans calls from certain rival companies, the security manager 212 can determine whether an incoming call is from one of the banned companies and can deny access to the IMC server 220 if such is the case. The database manager 214 retrieves information relating to the IMC servers 220 supported by the MSU 210 from an IMC server database 215. The IMC server database 215 preferably includes data indicating to which IMC server 220 each IMC client 212 is registered and can also include information that allows a remote IMC client 212 to be redirected to its IMC server 220. For example, this information can be used to allow an IMC client 212 to log in remotely. The data switch unit 216 routes and/or multicasts incoming and outgoing communications to and from the IMC server 220.

The IMC server 220 is in communication with the MSU 210, and preferably resides in a private network 320 inside of another firewall 160. The IMC server 220 includes a presence manager 222, a session manager 224, and a database manager 226. The presence manager 222 handles presence information associated with the IMC clients 212 registered on the IMC server 220 as well as presence information received from remote IMC clients, e.g., 212a, 212b, registered in other IMC networks 200a, 200b. An IMC client 212 can access the presence manager 222 to identify other IMC clients 212 who might be available for an IMC session. The session manager 224 creates secure and real-time IMC sessions involving the registered IMC clients 212. During an IMC session, IMC clients 212 can exchange text messages, audio and video clips, application tools, and other multimedia objects. The database manager 226 retrieves information relating to the IMC clients 212 registered on the IMC server 220 from an IMC client database 228. The IMC client database 228 preferably stores data such as an IMC client's peer list, as well as an IMC client's function default selections, presence grant list, i.e., who is allowed to see the presence of this IMC client, and call history.

FIG. 5 is a detailed flow diagram illustrating a process for creating a secure and real-time communication session between IMC clients according to another version of the present invention. Referring to FIG. 2, FIG. 4 and FIG. 5, the process begins when a first IMC client, e.g., IMC client A (212) in Company C, generates a call inviting a second IMC client to engage in an IMC session (step 500). In this example, the second IMC client is registered on an IMC server 220a in Company A. Accordingly, the first and second IMC clients 212, 212a reside in different IMC networks 200, 200a. Nothing prevents the first and second IMC clients 212 from residing in the same IMC network 200 or even sharing the same IMC server 220.

The call preferably identifies, among other things, the second IMC client 212a, referred to as "the invitee," and an address associated with the invitee 212a. In one version, the call can include such information as:
Invitee ID
ID of invitee's IMC server
Name of invitee's MSU
Inviter ID
ID of inviter's IMC server
Name of inviter's MSU
Security information (e.g. security key index, encryption scheme).

In a preferred embodiment, each IMC client 212 in the system 100 is assigned an IMC session address that is compatible with and similar to existing electronic mail systems. The IMC session address is used to identify the IMC client 212 for the purpose of establishing an IMC session, and includes a user name associated with the IMC client 212 and an IMC domain ID associated with the IMC network 200 in which the IMC client 212 resides. The IMC domain ID can be resolved, via a DNS, into an IP address for the MSU 210 associated with the IMC network 200. Accordingly, in a preferred embodiment, the call includes the IMC session addresses for both the first and second IMC clients 212, 212a. The IMC session address will be discussed in more detail below.

After the call is generated (step 500), the inviter's IMC server 220 processes the call. In particular, the session manager 224 in the IMC server 220 creates a first IMC session including the inviter 212, and resolves the invitee's IMC session address into an IP address so that the call can be sent to the invitee 212a (step 502). At this point, the session manager 224 is able to determine whether the invitee 212a is registered on the same IMC server 220, residing in the same IMC network 200 but registered on a difference IMC server 220, or residing in a different IMC network 200a altogether. In the first instance, the session manager 224 can contact the invitee directly. In the later two instances, the session manager 224 will send the resolved call to the MSU 210 for proper routing and security checking.

In this example, the invitee 212a resides in a different IMC network 200a and therefore, the resolved call is sent to the inviter's MSU 210. The call passes through the data switch unit 216 and to the security manager 212 in the MSU 210, which performs a security check. If no policies are violated, the call is sent over the Internet to the invitee's IMC network 200a (step 504).

The MSU 210a at the invitee's IMC network 200a receives the call and uses its security manager 212 to perform a security check (step 506). The security check can apply at a hub level and/or at an application level. If at any time a security policy is violated, the call will be denied and/or a message will be returned to the inviter indicating why an IMC session cannot be established. If the security manager 212 clears the call, the MSU 210a uses the invitee's username in the IMC session address to identify the IMC server 220a on which the invitee is registered. The MSU 210a uses the database manager 214 to retrieve such information from the IMC server database 215. Once the IMC server 220a is identified, the call passes through the data switch unit 216 to the invitee's IMC server 220a (step 508).

The invitee's IMC server 220a preferably checks to determine whether the invitee wants to accept the call by, for example, checking the presence manager 222 to determine whether the invitee is available to accept the call and checking the invitee's permission rules stored in the client database 228. If the invitee accepts the call, the invitee's session manager 224 creates a second IMC session that interacts with the first IMC session created in the inviter's IMC network 200 (step 510). Together, the first and second IMC sessions form an interactive IMC session between the first and second IMC clients 212, 212a. The interactive IMC session is secure and supports real-time data exchanges across two domains.

After the interactive IMC session is established between the first and second IMC clients 212, 212a, the second IMC client 212a decides to invite a third IMC client, e.g., IMC client 212b at Company B, to the interactive IMC session. In this instance, the second IMC client 212a is considered to be the new inviter and the third IMC client 212b is considered a new invitee. The new inviter 212a generates a call to invite the new invitee 212b to engage in the ongoing IMC session (step 512). In this instance, the call identifies each of the existing participants, i.e., the first and second IMC clients 212, 212a. The new inviter's IMC server 220a processes the call (step 514) and sends the processed call to the new inviter's MSU 210a and to the inviter's MSU 210. The inviter's MSU 210 performs a security check, and if the call is cleared, notifies the new inviter (step 515). The new inviter's MSU 210a also performs a security check, and if the call is cleared by all participants, the new inviter's MSU 210a forwards the call over the Internet to the new invitee's IMC network 200b (steps 516).

The MSU 210b at the new invitee's IMC network 200b receives the call and uses its security manager 212 to perform a security check (step 518). If the security manager 212 clears the call, the MSU 210b passes the call through the data switch unit 216 to the new invitee's IMC server 220b (step 520), which checks to determine whether the new invitee wants to accept the call. If the new invitee accepts the call, the new invitee's session manager 224 creates a third IMC session that interacts with the first and second IMC sessions created in the inviter's and the new inviter's IMC networks 200, 200a, respectively (step 522). Together, the first, second and third IMC sessions now form one interactive IMC session between the first, second and third IMC clients 212, 212a, 212b.

The process described above can be repeated to add more IMC clients to an existing interactive IMC session. In one version, whenever a new call is generated inviting a new IMC client to join, all the existing participants must clear the new call before it is forwarded to the new IMC client. In another version, the non-approving participant can automatically excuse itself from the IMC session. In another version, the non-approving participant can have the option of excusing itself from the IMC session.

As stated above, in a preferred embodiment, each IMC client 212 can be identified by its IMC session address, which includes the IMC client's username and IMC domain ID. The IMC domain ID can be resolved (by a DNS) to point to the MSU 210 associated with the IMC network 200 in which the IMC client 212 resides. Thus, the IMC session address simultaneously identifies the IMC client and the IMC client's location. Note that the IMC client 212 is typically associated with a user who utilizes the IMC client 212 to conduct real-time communications with other users.

While this feature offers many advantages, e.g., familiarity, and the ability to utilize existing email infrastructure, those skilled in the art would appreciate that the setup for such a system would require extensive efforts by a company's technology department. For example, users would need to be assigned IMC session addresses, databases would need to be updated, and security policies would need to be reconfigured to check IMC session addresses. Such efforts can overwhelm an IT department and delay the deployment of the IMC system.

Accordingly, to avoid these and other concerns, each IMC server 220 is configured to automatically convert a user's email address into the user's IMC session address. Accordingly, a user who wishes to call another user to engage in an IMC session can identify the other user by his/her email address and no other addressing system is required.

In order to perform this conversion quickly and efficiently, the user's IMC session address is a particular variation of the user's email address. The IMC server 220 converts the user's email address by applying the particular variation to the email address to generate the user's IMC session address. For example, in one version, if the typical email address is of the form <user1@domain.com>, the particular variation can be to attach a prefix to the domain in the email address to form an implicit sub-domain. The prefix can be an unusual character string, such as "i-m-c," that is used globally to identify an IMC system. Thus, applying this variation, the IMC server 220 would convert the email address, <user1@domain.com>, into the IMC session address, <user1@i-m-c.domain.com>. The IMC session address can be resolved through the DNS to point to the MSU 210 associated with the IMC client 212.

By enabling each IMC server 220 to convert email addresses into IMC session addresses automatically, email addresses can be the basis of the global identification scheme for both email systems and IMC systems. This is advantageous from the user's perspective because users routinely know and store the email addresses of their contacts and are familiar with using email to communicate with others. Thus, using the IMC system is easy and intuitive and would not require users to memorize or store another set of IMC session addresses for each contact.

This is also advantageous from the company's standpoint because addressing is automated, and symmetric system setup is not required. The IMC system can be rapidly deployed without extensive training and setup. Moreover, existing security policies based on email domain names can be implemented by the IMC system because addressing is based on email addresses.

Advantageously, the address conversion process described above is not limited to the IMC system, but can be implemented for any new internet-based service. In other words, for any new internet-based service that requires addressing, an entity's email address can be converted automatically into the new address by attaching a prefix specific to that new internet-based service. This conversion would be transparent to the user.

In the versions described above, the call connections are implemented over the Internet. According to another version of the present invention, the IMC server 220 sends a call by placing a PSTN call to the destination IMC server 220. In this call connection method, the PSTN network is utilized so no phone number lookup is necessary through the Internet. The destination IMC server 220 can be reached through the PSTN network so long as the phone line is stable. Once the call connection is passed over the phone line, the destination IMC server 220 can decide to accept the call or not based on company security policy. One security policy example can be that if the caller ID and caller IMC server phone number is not pre-registered, the call is denied.

Once the call is accepted by the destination IMC server 220, it determines whether the invitee is available. If not, the IMC server 220 responds to the inviter with an appropriate message and disconnects. If the invitee is available, an instant message is forwarded to the invitee's IMC client for final call connection.

A version of the present invention is an instant multimedia communication (IMC) system that includes a plurality of IMC autonomous networks (IMC networks). Each IMC network includes at least one IMC server that supports a plurality of IMC clients that register with the IMC server. In a preferred embodiment, each IMC network is capable of communicating with other IMC networks in a secure manner either over an intranet within a company or over a public network, such as the Internet. Thus, secure IMC sessions can be implemented between IMC clients in at least two companies without requiring an independent IM service provider. Also, because IMC networks are not isolated from one another, the IMC system is scalable. The IMC system can expand or contract with the needs of a company or of an industry. Also when more IMC networks are implemented by companies, there is no impact on existing IMC networks. For a service provider who is providing IMC service to enterprises, as an example, the scalability is extremely important.

The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

We claim:

1. A method for assigning a session address for an entity for providing a secure internet-based communication service other than an electronic mail (email) service, the method comprising:

receiving an email address for an entity, wherein the email address includes a username and a domain name;

selecting a prefix that is uniquely associated with a secure internet-based communication service other than an email service; and attaching automatically the prefix to the domain name of the email address to convert the email address of the entity into a session address for the entity for purposes of providing the secure internet-based communication service, wherein at least one of the preceding actions is performed on at least one electronic hardware component.

2. A computer readable storage medium containing program instructions, which when executed by a computer system, implements a process for assigning a session address for providing a secure internet-based communication service other than an electronic mail (email) service, the process for:

receiving an email address for an entity, wherein the email address includes a username and a domain name;

selecting a prefix that is uniquely associated with a secure internet-based communication service other than an email service; and attaching automatically the prefix to the domain name of the email address to convert the email address of the entity into a session address for the entity for purposes of providing the secure internet-based communication service.

3. The method of claim 1 wherein the entity is associated with a user and the email address for the entity is the user's email address.

4. The computer readable storage medium of claim 2 wherein the entity is associated with a user and the email address for the entity is the user's email address.

* * * * *